(No Model.)

I. L. LANDIS.
HEDGE.

No. 448,527. Patented Mar. 17, 1891.

Witnesses
John Imrie
C. D. Davis

Inventor
I. L. Landis
By his Attorney
C. M. Alexander

UNITED STATES PATENT OFFICE.

ISRAEL L. LANDIS, OF LANCASTER, PENNSYLVANIA.

HEDGE.

SPECIFICATION forming part of Letters Patent No. 448,527, dated March 17, 1891.

Application filed November 22, 1890. Serial No. 372,271. (No model.)

*To all whom it may concern:*

Be it known that I, ISRAEL L. LANDIS, a citizen of the United States, residing at Lancaster, in the county of Lancaster and State of Pennsylvania, have invented certain new and useful Improvements in Hedges, of which the following is a specification, reference being had therein to the accompanying drawings, in which—

Figure 1:
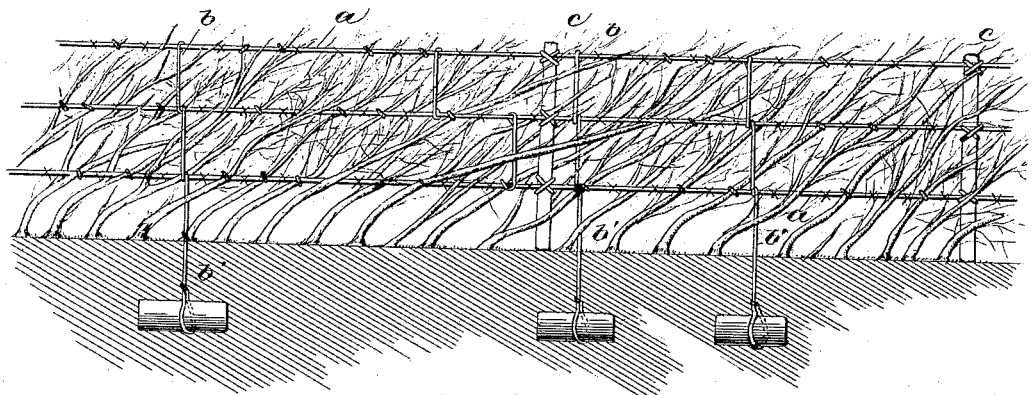
Figure 2:
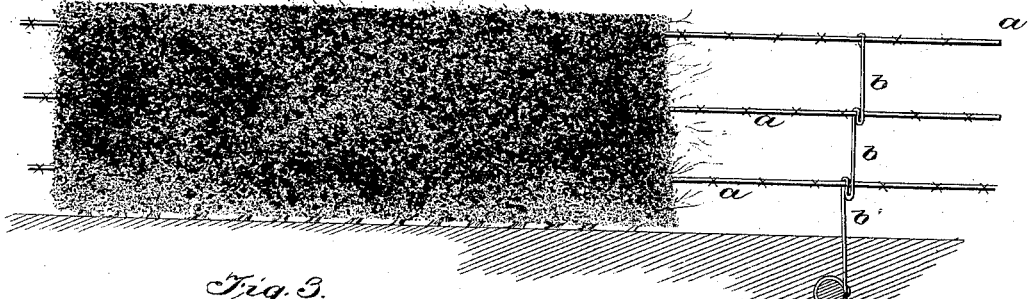
Figure 3:
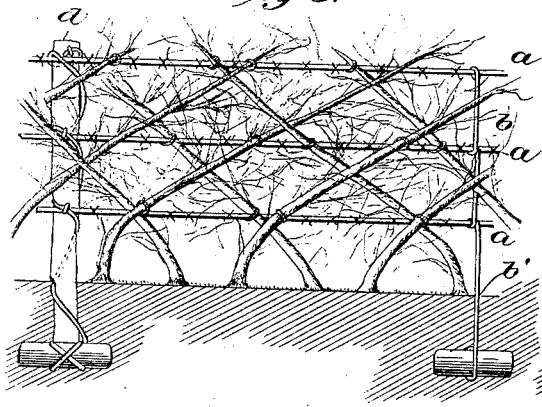
Figure 4:
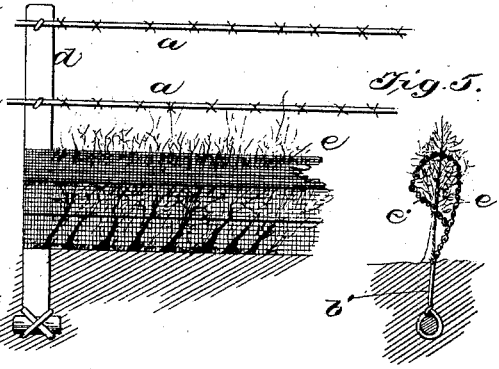

Figure 1 represents a side elevation of my improved hedge stripped of its foliage to show more clearly the method of training and plashing the plants; Fig. 2, a similar view of the hedge complete as it appears when fully grown and trimmed; Fig. 3, a view showing a modification; Fig. 4, a side view showing the means employed for training and confining very young plants, and Fig. 5 a transverse sectional view of the same.

The object of the invention is to produce a hedge fence, which will not only be extremely simple and inexpensive in construction, but which will also, when grown, be very substantial and dense, so as to serve efficiently as a fence and not be disturbed or injured by storms or cattle, as will more fully hereinafter appear.

The hedge-plants are planted, as usual, at regular intervals along the line of the fence and are turned or bent over, preferably, in the same direction when young, the plants being loosely tied to horizontal wires $a$ by means of tarred rope or other means which will not injure the plants. There may be any number of the horizontal wires; but I preferably use three, and I usually tie the first year's growth to the lower wire, the second year's growth to the second wire, and so on until the hedge has attained the growth and height desired, as shown in Fig. 1. Tying the plants to the wires serves to train them properly and form a thick dense hedge. The horizontal wires are preferably barbed to prevent the cattle from injuring the hedge while the latter is yet young. The wires are connected together and properly spaced by vertical links $b$, and the lower wire is securely anchored by anchoring-wires $b'$, extending into the ground and tied to blocks or stones buried therein. The links $b$ may be formed separately, or they may be formed, together with the anchoring-wires of a single wire, as shown. When formed of a single wire, loops are preferably formed in the wire for the reception of the main wires, as shown at the right of Fig. 2, these loops being clinched after the wires are inserted in them to prevent the displacement of the latter. The tendency of the plants to spring upward after being bent over will support and hold up the main wires; but until the plants attain a sufficient growth temporary uprights $c$ are tied to the wires and rested upon the ground, as shown in Fig. 1.

In lieu of or in addition to the anchoring-wires, posts $d$ may be employed, as shown in Figs. 3 and 4, these posts being anchored by being tied to blocks buried in the ground, the same wire that ties the block to the post being carried up and employed to secure the horizontal wires thereto, as shown in Fig. 3.

Instead of bending the hedge-plants all in one direction, they may be arranged as shown in Fig. 3—that is, they may be bent or inclined in opposite directions, if desired, the plants being tied to the wires at their intersection with the same.

Figure 5:
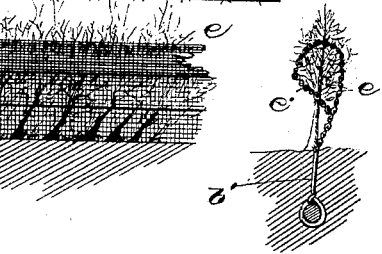

While the plants are yet young, it is sometimes desirable to employ a strip of wire-netting $e$, as shown in Figs. 4 and 5, to assist in training and protecting them. The netting is suitably anchored and it is arranged alongside of the plants, its upper edge being preferably bent over the top of the young plants, forming a hood-like arrangement, the plants growing up through the meshes of the netting and becoming intertwined therein as the plants grow. This netting also serves to prevent small animals crawling under the hedge, and serves to assist in making it close and dense near the ground. The overhanging edge of the netting may be held down by suitable tie-wires $e'$.

This hedge has a number of important advantages. The plants are not injured or bruised in the slightest degree, and in this respect it possesses advantages over other arrangements, which employ metal staples and nails driven into the living plants, and other devices to injure and stunt the growth of the plants. The plants in my hedge are not cut partially through in order to bend them into position; neither do I cut away the roots of the plants on one side to facilitate bending; neither do I employ metal rings or loops to secure the plants to the supporting-wires, as some of the arrangements now in use do, such devices serving to interrupt the flow of sap in the plants and prevent them attaining their full strength; but on the contrary I employ means which do not injure the plants in the least, but allow them to attain their full growth and strength, forming a hedge that will be both strong and dense and at the same time very simple and inexpensive. It will also be observed that the horizontal wires have a direct positive electrical connection with the earth, whereby whenever the wires become charged with electricity from strokes of lightning or otherwise the current will be readily conducted off into the earth without injury to the plants.

Having thus fully described my invention, what I claim is—

1. In a hedge, the combination of the horizontal wires, links connecting the horizontal wires together and to anchoring-blocks buried in the ground, hedge-plants planted along the line of the wires, and a strip of wire-netting arranged along the line of the hedge and having its upper edge turned over and secured to form a hood, the sprouts of the plants being intertwined in the meshes of the wire-netting, substantially as described.

2. The combination of the hedge-plants and a strip of wire-netting arranged alongside the plants and suitably anchored, the sprigs or sprouts of the plants being intertwined in the meshes of the wire-netting, substantially as described.

In testimony whereof I affix my signature in presence of two witnesses.

ISRAEL L. LANDIS.

Witnesses:
C. D. DAVIS,
ALEX. S. STEUART.